US008906145B2

(12) United States Patent
Hilberer

(10) Patent No.: US 8,906,145 B2
(45) Date of Patent: Dec. 9, 2014

(54) COMPRESSED AIR SUPPLY DEVICE FOR A UTILITY VEHICLE AND AIR DRYER CARTRIDGE

(75) Inventor: Eduard Hilberer, Hockenheim (DE)

(73) Assignee: Knorr-Bremse Systems fuer Nutzfahrzeuge GmbH, Munich (DE)

( * ) Notice: Subject to any disclaimer, the term of this patent is extended or adjusted under 35 U.S.C. 154(b) by 1282 days.

(21) Appl. No.: 12/367,248

(22) Filed: Feb. 6, 2009

(65) Prior Publication Data

US 2009/0193977 A1 Aug. 6, 2009

Related U.S. Application Data

(63) Continuation of application No. PCT/EP2007/005716, filed on Jun. 28, 2007.

(30) Foreign Application Priority Data

Aug. 8, 2006 (DE) .......................... 10 2006 037 307

(51) Int. Cl.
*B60T 17/00* (2006.01)
*B01D 53/04* (2006.01)
(52) U.S. Cl.
CPC ............... *B60T 17/004* (2013.01); *Y10S 55/30* (2013.01)
USPC .......................... 96/149; 96/152; 55/DIG. 30
(58) Field of Classification Search
USPC ....... 55/515, DIG. 30; 96/137, 139, 149, 152; 95/117; 34/80, 472, 473
See application file for complete search history.

(56) References Cited

U.S. PATENT DOCUMENTS

| 4,946,485 | A |   | 8/1990  | Larsson              |
|-----------|---|---|---------|----------------------|
| 5,110,327 | A | * | 5/1992  | Smith ............... 96/113 |
| 5,286,282 | A | * | 2/1994  | Goodell et al. .......... 96/113 |
| 5,286,283 | A |   | 2/1994  | Goodell              |
| 5,622,544 | A | * | 4/1997  | Shamine et al. ......... 96/134 |
| 5,779,772 | A | * | 7/1998  | Unger et al. ............ 96/137 |
| 5,792,245 | A |   | 8/1998  | Unger et al.         |
| 5,851,269 | A |   | 12/1998 | Strope               |
| 6,484,413 | B1 | * | 11/2002 | Larsson ............... 34/80 |

FOREIGN PATENT DOCUMENTS

| DE | 197 21 230 A1 | 11/1998 |
| EP | 0 608 606 A1 | 8/1994 |
| EP | 1 048 540 A1 | 11/2000 |
| EP | 1 495 934 A2 | 1/2005 |
| WO | WO 95/07831 A1 | 3/1995 |
| WO | WO 00/26074 A1 | 5/2000 |
| WO | WO 01/26783 A1 | 4/2001 |
| WO | 2004/011125 A2 | 2/2004 |

OTHER PUBLICATIONS

International Search Report dated Dec. 27, 2007 with English translation (twelve (12) pages).
Chinese Office Action mailed Dec. 27, 2010 together with English translation thereof.

* cited by examiner

*Primary Examiner* — Frank Lawrence
(74) *Attorney, Agent, or Firm* — Crowell & Moring LLP

(57) ABSTRACT

A compressed air supply device is provided for a utility or commercial vehicle. The device includes a valve housing and an air dryer cartridge which has a housing. A drying agent box, which is filled with drying agent, is arranged in the housing of the air dryer cartridge. The drying agent can be compressed by an elastic device.

7 Claims, 14 Drawing Sheets

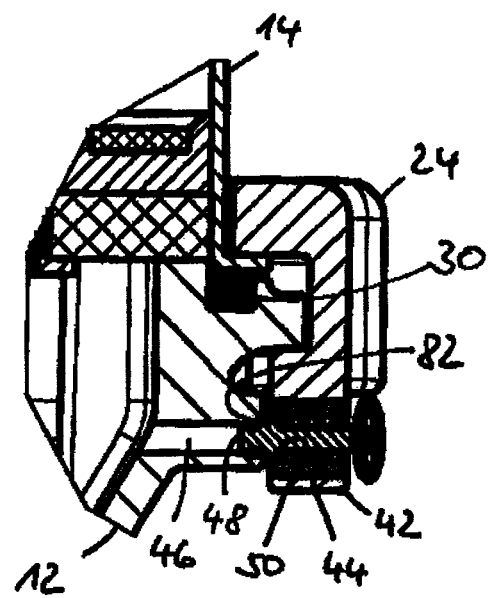

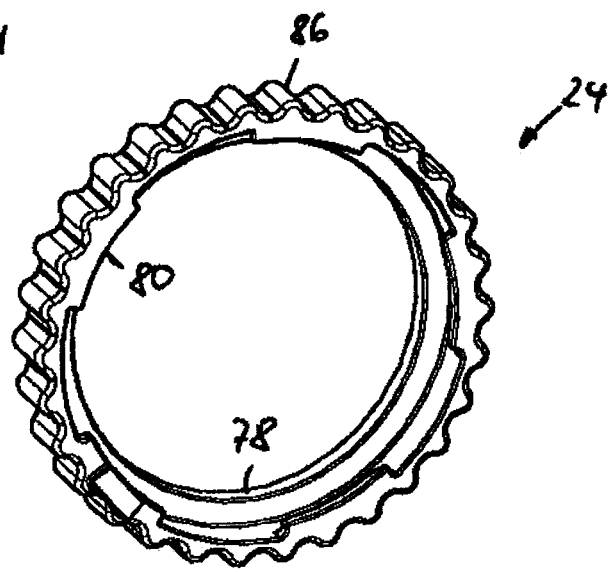
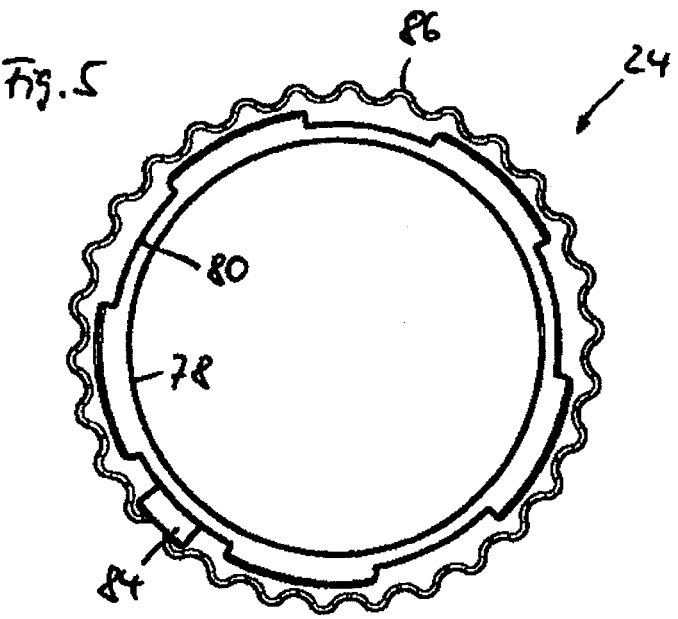

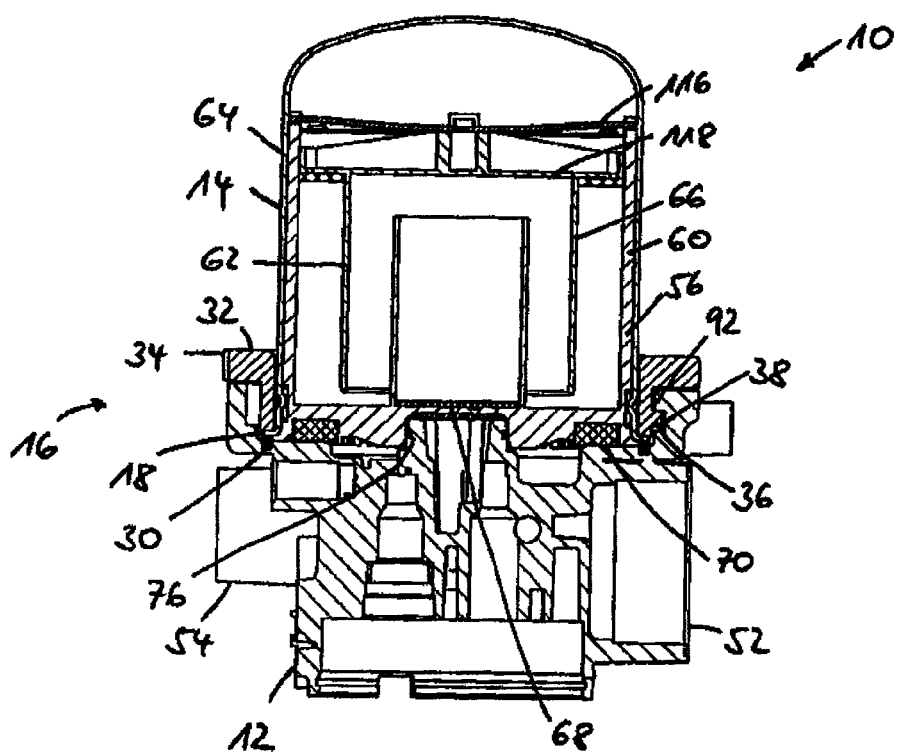

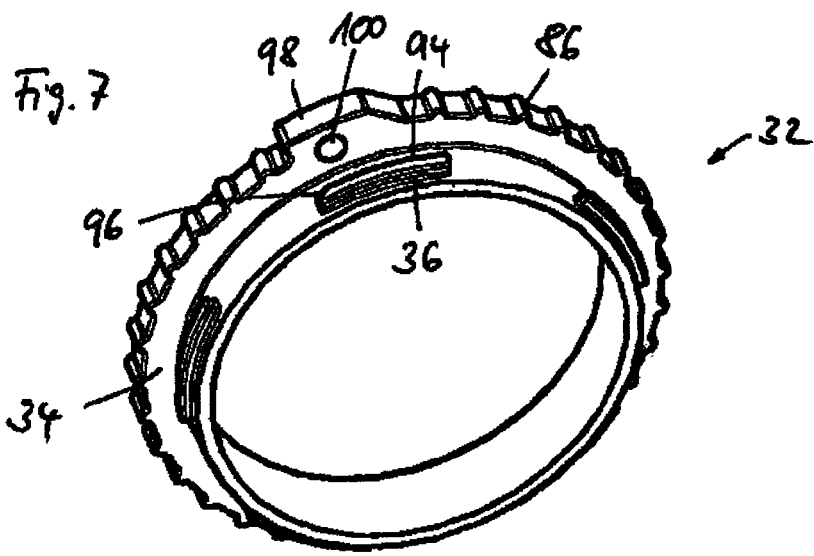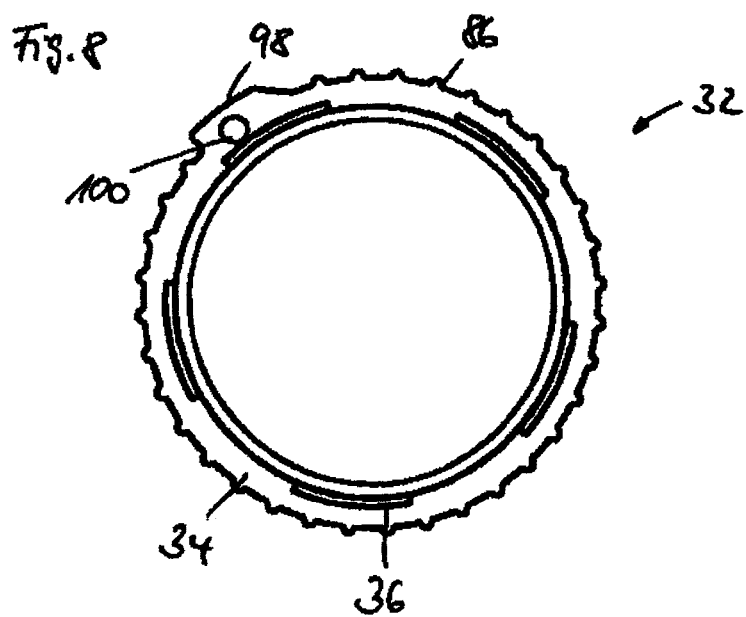

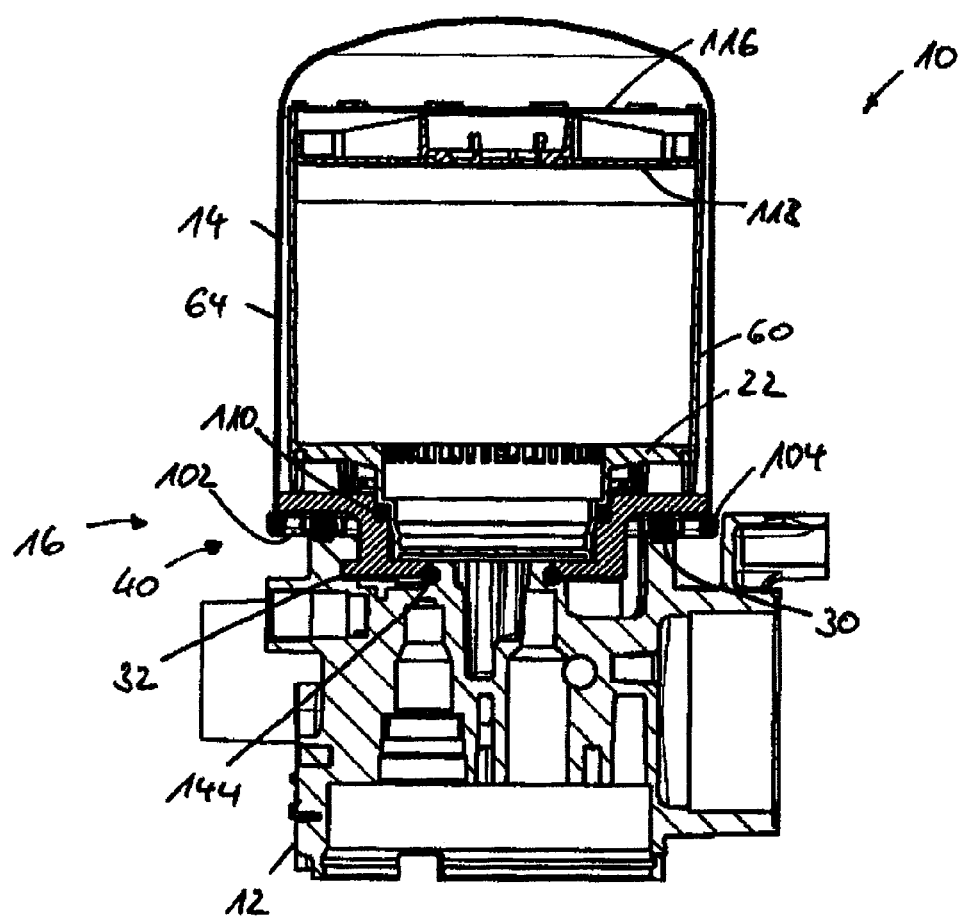

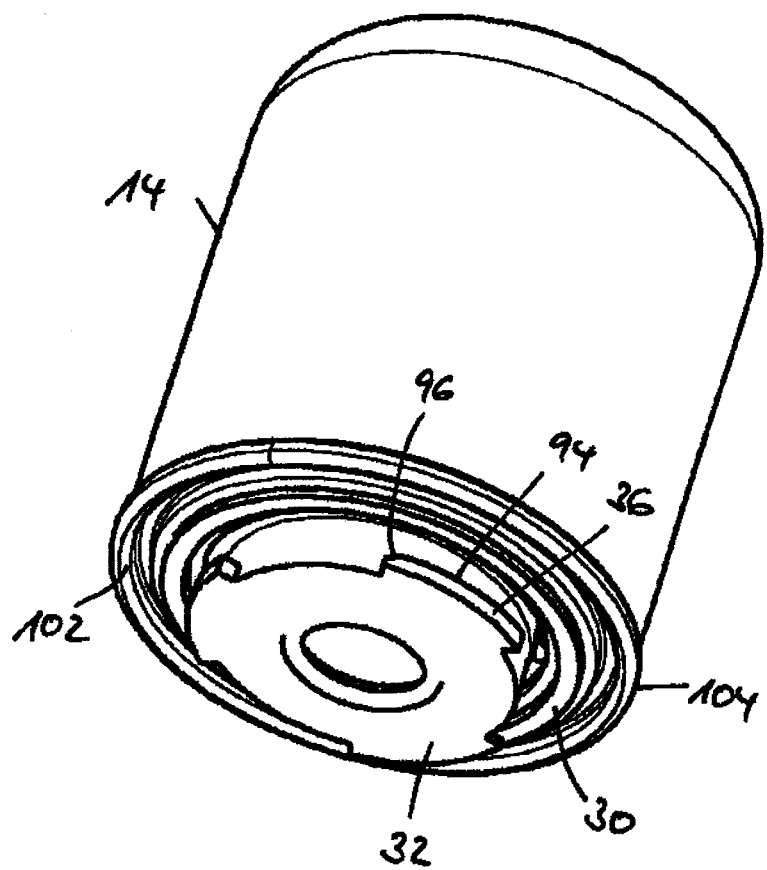

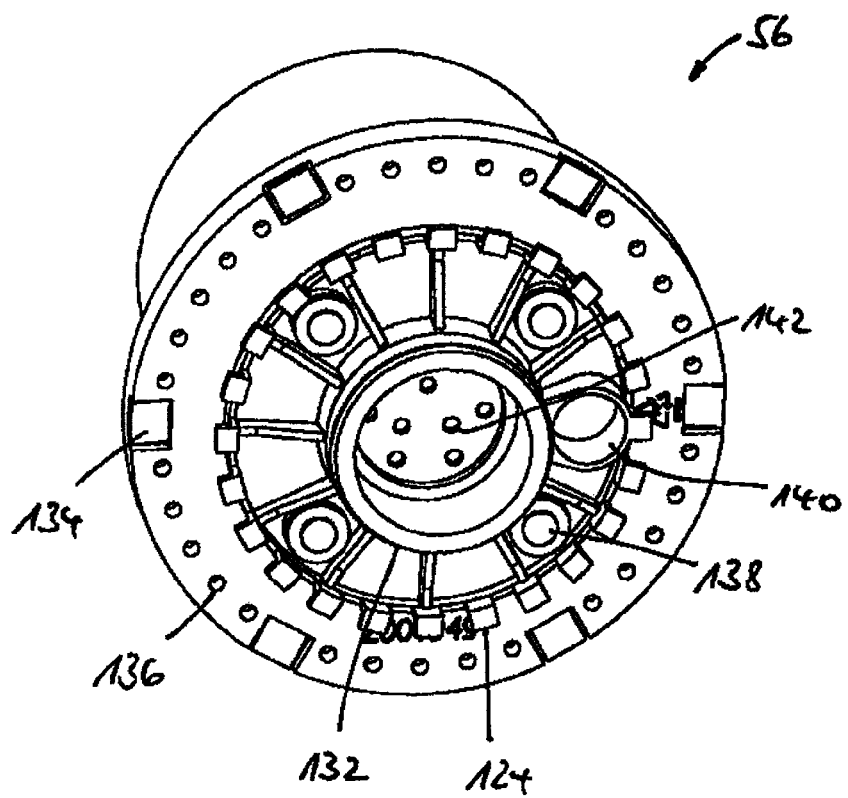

COMPRESSED AIR SUPPLY DEVICE FOR A UTILITY VEHICLE AND AIR DRYER CARTRIDGE

CROSS-REFERENCE TO RELATED APPLICATIONS

This application is a continuation of PCT International Application No. PCT/EP2007/005716, filed Jun. 28, 2007, which claims priority under 35 U.S.C. §119 to German Patent Application No. DE 10 2006 037 307.3, filed Aug. 8, 2006, the entire disclosures of which are herein expressly incorporated by reference.

BACKGROUND AND SUMMARY OF THE INVENTION

The invention relates to a compressed air supply device for a utility or commercial vehicle, having a valve housing and having an air dryer cartridge, which includes a housing.

The invention further relates to an air dryer cartridge.

Compressed air supply devices are known to provide treated compressed air to compressed air consumers in utility/commercial vehicles. Typical compressed air consumers are, for example, a pneumatic brake system or an air suspension system. A compressed air supply device combines numerous functions. One important task is that of drying and cleaning the air. For this purpose, an air dryer cartridge is provided, which contains filter devices and a drying agent. Other important tasks are those of regulating the pressure of the compressed air provided by a compressor and reliably distributing the compressed air between the different consumer circuits. These tasks are performed by valve devices which are accommodated in a valve housing, specifically a pressure regulator and a multi-circuit protection valve. Modern compressed air supply devices include, in addition to the pneumatic components, an electronic controller and electrically actuable components, for example solenoid valves, and a sensor arrangement which is connected to the electronic controller. The compressed air supply devices which are equipped in this way are also referred to as EAC (Electronic Air Control) systems.

It is generally sought for the air drying to take place in as effective and efficient a manner as possible, wherein this requires, in particular, good utilization of the volume available in the air dryer cartridge.

The object on which the invention is based is that of further developing a generic compressed air supply device and an air dryer such that the drying agent completely fills the dryer volume, and is tightly packed, at all times.

This and other objects are achieved by a compressed air supply device for a utility vehicle, having a valve housing and having an air dryer cartridge which includes a housing. A drying agent box, which is filled with drying agent, is arranged in the housing of the air dryer cartridge. The drying agent is compressable by way of an elastic device.

Advantageous embodiments of the invention are described herein.

The invention provides a drying agent box, which is filled entirely with drying agent, arranged in the housing of the air dryer cartridge. The drying agent can be compressed by an elastic device. The elastic device ensures that the drying agent, which is present as granulate, is always tightly packed such that the air to be dried is subjected in an optimum manner to the drying action of the granulate. Even in the event of operation-induced fluctuations in volume of the drying agent, the elastic device ensures that the tight packing is maintained.

This may be realized, for example, in that the elastic device is a spring which is supported on the valve housing and which presses the drying agent box into the air dryer cartridge.

It may likewise be provided that the elastic device is a spring device which is fastened to the drying agent box and which drives a compression device into the drying agent box.

It may also be provided that the elastic device is realized by a plurality of spring elements, which are fastened to the drying agent box and which are supported on a housing of the air dryer cartridge and press the drying agent box into the air dryer cartridge.

According to one particularly preferred embodiment, it is provided that the drying agent box has a base on which are arranged an outer tube piece and an inner tube piece, which are open at their side facing away from the base. A further tube piece is arranged between the outer tube piece and the inner tube piece, which further tube piece is open at its side facing toward the base and can be moved in the axial direction relative to the drying agent box by the elastic device. From the outside to the center of the air dryer cartridge, there are therefore four successive walls, formed specifically by the housing of the air dryer cartridge, the outer tube piece of the drying agent box, the further tube piece, and the inner tube piece of the drying agent box.

In this way, it is provided that the housing of the air dryer cartridge, the outer tube piece, the further tube piece, and the inner tube piece form a labyrinth through which compressed air to be dried can flow whilst undergoing three reversals in flow direction. Such a labyrinthine design serves to lengthen the air path through the drying agent. In this way, it is possible for the drying action of the air dryer cartridge to be improved, or it is possible, for an unchanged drying action, to realize an air dryer cartridge with a reduced structural height.

According to one embodiment of the present invention, it is provided that the further tube piece is fastened to the housing of the air dryer cartridge. This fastening may, for example, be realized by way of spot welding, with the connection between the further tube piece and the air dryer cartridge being sealed off by a seal in order to thereby reliably define the air path through the labyrinth. The seal may, for example, be provided in the form of a hardenable material.

According to a further embodiment of the present invention, it is provided that the further tube piece is fastened to the compression device. The compression device, which is acted on with force by a spring, is thereby driven into the drying agent box together with the further tube piece in order to thereby provide the desired compression action of the granulate.

According to a further embodiment of the present invention, it is provided that the drying agent box has a base on which is arranged a tube piece which is open at its side facing away from the base, and that the compression device is arranged within the tube piece and can be moved in the axial direction relative to the drying agent box by the elastic device. In an arrangement of this type, the air to be dried flows firstly through the region between the tube piece and the housing of the air dryer cartridge in order to then, after a flow reversal, flow centrally through the drying agent box and then out of the latter.

It may be provided that the drying agent box interacts in a sealing fashion with the valve housing by way of a radial seal. This is expedient, in particular, in so-called open systems in which the air dryer cartridge seals off directly against the valve housing.

In closed systems, in which a foot flange seals off against the valve housing, it is provided that the drying agent box interacts in a sealing fashion with a foot flange of the air dryer cartridge by way of a radial seal.

It is also expediently provided that the drying agent box is connected to the housing of the air dryer cartridge by a latching device which enables an axial relative movement of the drying agent box and housing. The enabling of the axial movement permits the relative movement, for the purpose of compressing the granulate, of the components which hold the granulate.

The invention also relates to an air dryer cartridge, in particular for use in a compressed air supply device according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a sectioned view of a part of a compressed air supply device according to the invention with a securing element;

FIG. 4 shows a perspective illustration of an outer bayonet ring;

FIG. 5 shows a plan view of an outer bayonet ring;

FIG. 6 shows a second embodiment of a compressed air supply device according to the invention, in a sectioned illustration;

FIG. 7 shows a perspective illustration of an inner bayonet ring;

FIG. 8 shows a plan view of an inner bayonet ring;

FIG. 9 shows a third embodiment of a compressed air supply device according to the invention, in a sectioned illustration;

FIG. 10 shows a perspective illustration of an air dryer cartridge with a foot flange and inner bayonet ring;

FIG. 17 shows a drying agent box in a perspective illustration.

DETAILED DESCRIPTION OF THE DRAWINGS

In the following description of the drawings, identical reference symbols are used to denote identical or comparable components.

Figure 1:
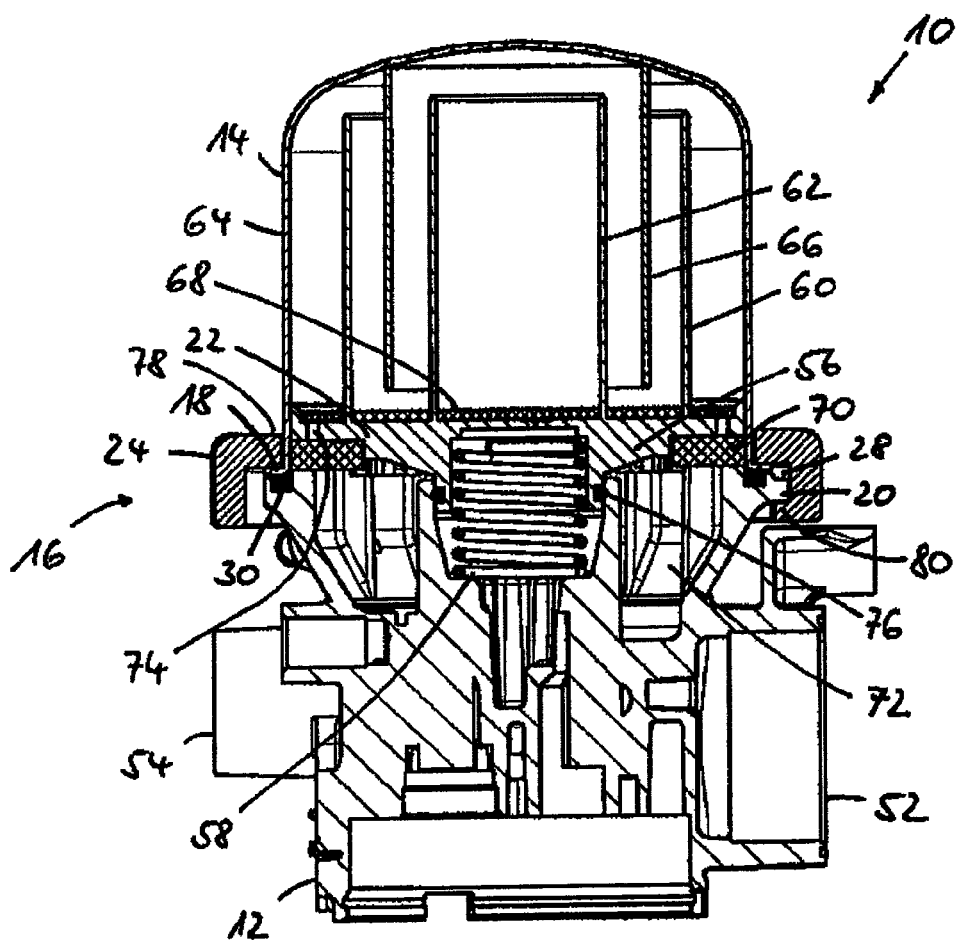
FIG. 1 shows a first embodiment of a compressed air supply device according to the invention in a sectioned illustration.
Figure 2:
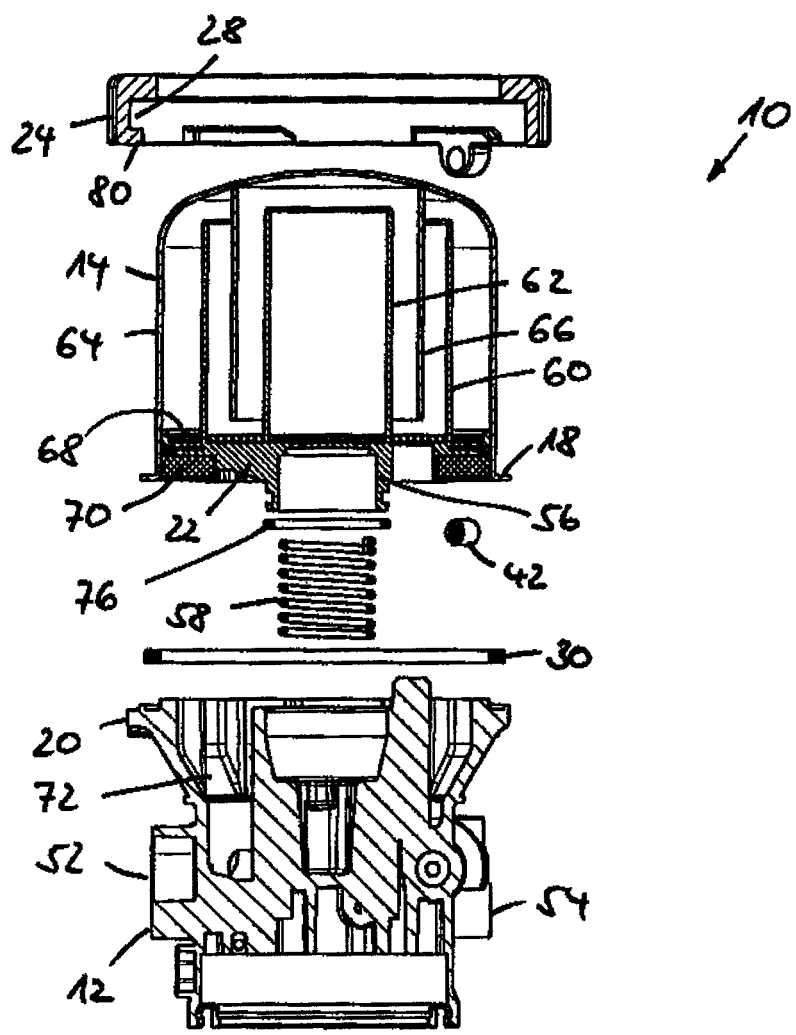
FIG. 2 shows a first embodiment of a compressed air supply device according to the invention in a sectioned exploded illustration.

FIG. 1 shows a first embodiment of a compressed air supply device according to the invention in a sectioned illustration. FIG. 2 shows a first embodiment of a compressed air supply device according to the invention in a sectioned exploded illustration. The compressed air supply device 10 has a valve housing 12 and an air dryer cartridge 14.

The valve housing 12 has an inlet 52 to which a compressor can be connected and via which compressed air, which is to be treated, can flow in. An outlet 54 for conducting the treated compressed air onward is also provided.

A drying agent box 56, which is preferably composed of plastic, is arranged in the air dryer cartridge 14. The drying agent box 56 projects into the valve housing 12 and is supported on the latter via a spring 58. The drying agent box 56 includes a base 22, an outer tube piece 60 and an inner tube piece 62, which extend into the air dryer cartridge 14. A further tube piece 66, which is fastened to the housing 64 of the air dryer cartridge 14 and which is preferably composed of metal is arranged between the tube pieces 60, 62, which further tube piece 66 is open in the direction of the valve housing 12 while the tube pieces 60, 62 of the drying agent box 56 are open in the opposite direction. The connection of the tube piece 66 to the housing 64 may expediently take place by way of spot welding, with additional sealing being provided, for example by way of hardening material. The tube pieces 60, 62, 66, which are arranged one inside the other in this way, and the housing 64 serve to form a labyrinth which is filled entirely with granulate for drying the compressed air which flows through the labyrinth. The tight packing of the drying agent in the air dryer cartridge 14 is provided by the force imparted by the spring 58, which force presses the drying agent box 56 into the air dryer cartridge 14. The space filled by drying agent is at least partially delimited in the direction of the valve housing 12 by nonwoven filter 68, wherein the individual regions, which are delimited by the tube pieces 60, 62, 66, of the nonwoven filter 68 may be composed of identical or different materials. In particular, the outer region of the nonwoven filter 68 between the tube piece 60 and the housing 64 of the air dryer cartridge 14 and the central region of the nonwoven filter 68 within the inner tube piece 62 are designed as dust filters, while the nonwoven region arranged between the outer tube piece 60 and the inner tube piece 62 is designed for absorbing and, when required, releasing foreign substances, which can emerge out of the drying agent box 56 via non-return valves (see FIG. 17). A pre-filter 70 is also arranged in the region of the lower delimitation of the air dryer cartridge 14, which pre-filter 70 may optionally have the properties of a coalescence filter. The pre-filter 70 serves, in particular, for cleaning the compressed air with regard to compressor oil and similar contaminants.

Compressed air which flows into the valve housing 12 via the inlet 52 is distributed via ducts in the valve housing 12 in order to then flow via the duct 72 to the pre-filter 70 and pass through the latter. Subsequently, the compressed air flows through the duct 74 and then through the nonwoven filter 68 into the tightly-packed drying agent. The air flows in the air dryer cartridge as far as beyond the open end of the outer tube piece 60 of the drying agent box 56, and is then deflected in order to flow back in the direction of the valve housing 12 between the outer tube piece 60 and the tube piece 66 which is fastened to the housing 64 of the air dryer. After the compressed air has passed the open end of the tube piece 60, the compressed air is again deflected in order to subsequently flow between the tube piece 66, which is fastened to the housing 64 of the air dryer cartridge 14, and the inner tube piece 62, and beyond the end of the tube piece 62. There, the air is again deflected in order to then flow centrally through the inner tube piece 62 and the nonwoven filter 68 and out of the air dryer cartridge 14 and the drying agent box 56, and back into the valve housing 12. The air is collected in the valve housing 12 via ducts and may then be extracted via the outlet 54.

To enable the air guidance described above, it is necessary for the drying agent box 56 to be sealed off with respect to the valve housing 12 by way of a seal 76, which is designed here as a radially acting seal, in particular as an O-ring. Furthermore, an axially acting seal 30 is provided, which seals off a collar 18 of the housing 64 of the air dryer cartridge 14 with respect to the valve housing 12. In order to provide the compression of the seal 30 required for the sealing action, a bayonet connection 16 is provided which holds the valve housing 12 and the air dryer cartridge 14 together. The bayonet connection 16 includes an outer bayonet ring 24 with inner recesses 28 which are formed in sections and which are formed by projections 80 and a collar 78 which is continuous in the tangential direction. The inner recesses 28 are suitable for holding collar sections 20 of the valve housing 12 and, with the collar sections 20, imparting an axial force via, in each case, beveled surfaces by way of a rotation of the outer bayonet ring 24 with respect to the valve housing 12, which axial force presses the collar 18 of the air dryer cartridge 14 against the valve housing 12 via the seal 30. The collar 78, which is continuous in the tangential direction, of the outer bayonet ring 24 therefore interacts with the collar 18, which is continuous in the tangential direction, of the air dryer cartridge 14, while the collar sections 20 of the valve housing interact with the projections 80 of the outer bayonet ring 24 by way of the inclined surfaces thereof, and thereby provide the characteristics of a bayonet connection during a relative rotation. In the exploded illustration of FIG. 2, a securing element is also shown which will be explained in more detail with reference to the following figure.

FIG. 3 shows a sectioned view of a part of a compressed air supply device according to the invention with a securing element. The securing element 42 is seated in an opening 44 of the outer bayonet ring 24 and is fixedly connected to the latter there. In the state illustrated in FIG. 3, a lug 48 of the securing element 42 protrudes into an opening 46 of the valve housing, which opening is connected to the compressed air channels in the valve housing 12. The lug 48 of the securing element 42 supports a seal 82 such that, in the illustrated state, an outflow of compressed air is prevented. If the outer bayonet ring 24 is to be rotated with respect to the valve housing 12 in order to open the bayonet connection 16, then it is firstly necessary to pull the securing element 42 outward, out of the opening 46 counter to the force of a spring 50. After the opening 46 is released, the compressed air can then flow out of the system; at the same time, the rotational movement of the outer bayonet ring 24 with respect to the valve housing 12 is enabled. During the closing of the bayonet connection 16, the outer bayonet ring 24 is rotated relative to the valve housing 12 in the closing direction until the lug 48 latches into the opening 46 again and seals the latter off. If the latching-in action is audible, then this simultaneously provides confirmation to the driver that the compressed air supply device 10 has been correctly assembled. Since an opening 46 for the outflow of compressed air is provided only at one peripheral position of the valve housing 12, it must be ensured that the outer bayonet ring 24 can be guided over the collars to be connected to one another only in precisely one position, for example by way of mechanical guides, in order that the securing element 42 and the opening 46 then also encounter one another during the closing process.

FIG. 4 shows a perspective illustration of an outer bayonet ring. FIG. 5 shows a plan view of an outer bayonet ring. The outer bayonet ring has, on its outer side, a corrugated surface 86, which improves handling during closing and opening. On the inner side of the outer bayonet ring 24, it is possible to see the projecting collar 78, which comes to rest on the collar 18 of the air dryer cartridge 14, and the projections 80, which interact with the sections 20 of the valve housing. It is also possible to see the securing element holder 84. It can be seen in FIG. 4 that the projections 80 increase in thickness from one end region to the other, with a more pronounced run-on bevel also being provided at the thinner end region. The run-on bevel may, for example, have an inclination of 30°, while the subsequent surface has a gradient of, for example, 1.5°.

FIG. 6 shows a second embodiment of a compressed air supply device according to the invention, in a sectioned illustration. In contrast to the embodiment described above, the bayonet connection 16 which connects the air dryer cartridge 14 to the valve housing 12 includes an inner bayonet ring 32. The inner bayonet ring 32 is guided over the air dryer cartridge 14 and is rotationally secured with respect to the air dryer cartridge by way of latching lugs 90 on the inner surface of the inner bayonet ring 32 and corresponding recesses 88 on the housing 64 of the air dryer cartridge. The inner bayonet ring 32 has an outwardly extending collar 34 and outwardly extending projections 36 which are offset axially with respect to the collar 34. The projections 36 have bevels which engage into recesses 38 of a part, which is situated partially outside the inner bayonet ring 32, of the valve housing 12 in order to interact with the radially inwardly extending projections 92 which delimit the recesses 38 at one side. For this purpose, the projections 92 likewise have bevels, which provides a non-positive connection between the projections 92 of the valve housing 12 and the projections 36 of the inner bayonet ring 32 via a relative rotation of the inner bayonet ring 32 and valve housing 12. As a result of the closure of the bayonet connection 16, an axially acting force is generated which acts via the collar 18 of the air dryer cartridge 14 on a seal 30; the seal interacts at the other side with the valve housing 12. A further seal 76 is designed as a radial seal, that is to say, in particular, as an O-ring. The seal 76 seals off the valve housing 12 with respect to the drying agent box 56, which is preferably composed of plastic.

With the system which is constructed and sealed in this way, efficient and effective air drying is again possible by virtue of compressed air flowing in via the inlet 52 of the valve housing 12, being distributed via air ducts in the valve housing 12 and flowing via a pre-filter 70, which is preferably designed as a coalescence filter, into the air dryer cartridge 14 or into the drying agent box 56 which is arranged therein. The drying agent box 56 in turn comprises an outer, upwardly open tube piece 60 and an inner, upwardly open tube piece 62. A further tube piece 66 is arranged between the outer tube piece 60 and the inner tube piece 62, which further tube piece 66 is open in the downward direction and is preferably composed of metal. The metallic tube piece 66 is held by a compression device 118 which is acted on with force by a spring device 116. The granulate which is provided in the drying agent box and which acts as drying agent is tightly packed by way of the spring force. The air flowing out of the pre-filter 70 flows outside the outer tube piece 60, that is to say between the outer tube piece 60 and the housing 64 of the air dryer cartridge 14, upward through axial ducts (not illustrated) which are arranged between the visible contact regions of the drying agent box 56. To further illustrate the air guidance, reference is made to FIG. 16. The air flows around the open end of the outer tube piece 60, enters into the space, which is free from drying agent, above the compression device 118, and subsequently flows downward between the downwardly open tube piece 66 and the outer tube piece 60 in order to then reverse its flow direction again and flow upward between the inner tube piece 62 and the downwardly open tube piece 66. After another flow reversal, the air to be dried then flows into the inner tube piece 62 in order to then leave the latter in the downward direction through a nonwoven filter 68, which acts as a dust filter, into the valve housing 12. Dried air is then discharged via the outlet 54.

The drying agent box 56 and the free region between the drying agent box 56 and the housing 64 are filled entirely with granulate. The latter may be of uniform design. It may also be particularly expedient to introduce different types of drying agent into the drying agent box 56. For example, the drying agent through which flow passes first may be optimized for more moist air, while the drying agent in the outflow region is optimized for the residual dehumidification of already pre-dried air.

FIG. 7 shows a perspective illustration of an inner bayonet ring. FIG. 8 shows a plan view of an inner bayonet ring. The inner bayonet ring 32 has a corrugated outer surface 86 which improves handling during the rotation of the inner bayonet ring 32. The corrugated outer surface is arranged on the outwardly directed collar 34 of the inner bayonet ring 32. Provided axially offset with respect to the collar 34 are projections 36, which are likewise directed outward and which have the inclination, required for the bayonet function, of the surface 94 which faces toward the collar 34. The inclination may, for example, be 1.5°. To facilitate the initial rotational movement during the closing of the bayonet connection, run-on bevels 96 are provided which have a considerably greater inclination, for example 30°. The projections 36 may advantageously have a stop in order to limit the closing movement of the bayonet connection. An axial bore 100 is visible on a shoulder 98 on the collar 34, which axial bore 100 has to receive the securing element 42 described in detail in connection with FIG. 3. During use, the securing element 42 is fixedly seated in the bore 100 so as to then latch with its lug into a bore, which permits the outflow of compressed air out of the compressed air supply device 10, in the valve housing 12. The advantageous combination of a compressed air discharge device and latching device is thereby also provided in combination with the inner bayonet solution.

The embodiments of the present invention described in connection with FIGS. 1 to 8 contain air dryer cartridges which are designed as open systems. This means that the air dryer cartridges seal off directly against the valve housing by way of a seal, that is to say in particular without an interposed flange.

Figure 11:
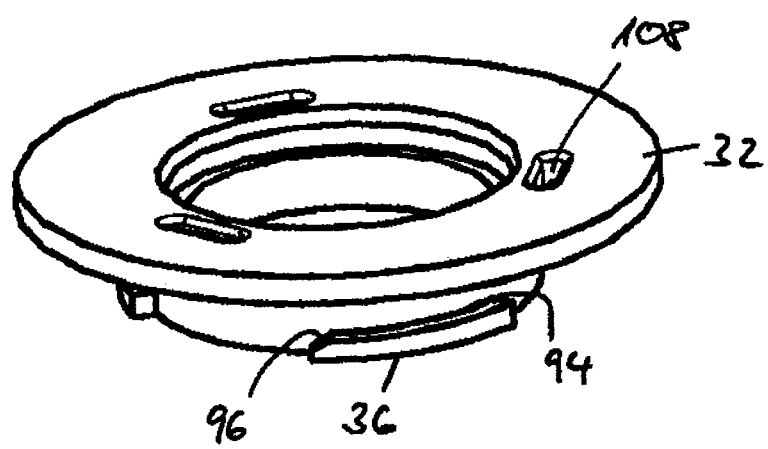
FIG. 11 shows a perspective illustration of an inner bayonet ring with a foot flange function.
Figure 12:
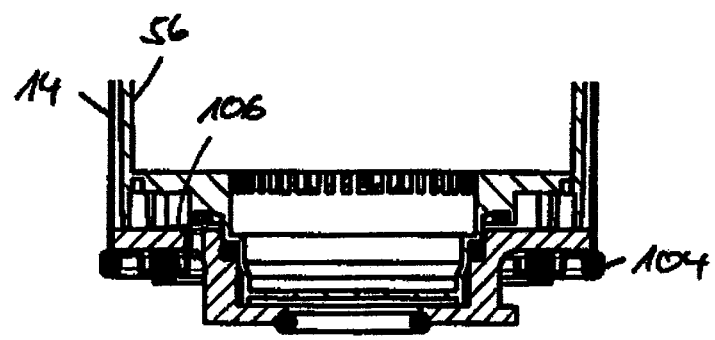
FIG. 12 shows a sectioned view of a part of a compressed air supply device according to the invention for explaining a first form of assembly of a foot flange.
Figure 13:
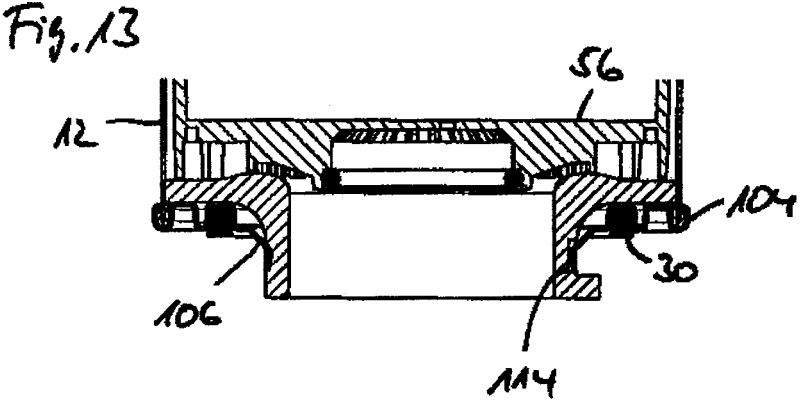
FIG. 13 shows a sectioned view of a part of a compressed air supply device according to the invention for explaining a second form of assembly of a foot flange.

FIG. 9 shows a third embodiment of a compressed air supply device according to the invention, in a sectioned illustration. FIG. 10 shows a perspective illustration of an air dryer cartridge with a foot flange and inner bayonet ring. FIG. 11 shows a perspective illustration of an inner bayonet ring with a foot flange function. FIG. 12 shows a sectioned view of a part of a compressed air supply device according to the invention for explaining a first form of assembly of a foot flange, and FIG. 13 shows a sectioned view of a part of a compressed air supply device according to the invention for explaining a second form of assembly of a foot flange. The system illustrated in these figures has a closed air dryer cartridge 14. Closed air dryer cartridges 14 are those whose housing 64 does not seal off directly against the valve housing 12, but rather a foot flange 40 is provided. The foot flange 40 is combined with an inner bayonet ring 32 which, with regard to its design providing the bayonet action, is comparable to the inner bayonet ring described in connection with FIGS. 6 to 8. Likewise, the valve housing 12, with regard to the bayonet connection 16, has a similar design to the valve housing 12 described in connection with FIG. 6. The inner bayonet ring 32 is connected by a cover 102 to the housing 64 of the air dryer cartridge 14. The connection of the cover 102 to the housing 64 of the air dryer cartridge takes place by way of a flanged edge 104. The foot flange 40 interacts via a seal 30, which bears against the cover 102, with the valve housing 12, with the sealing force acting in the axial direction. A further radially acting seal 144 is provided between the valve housing 12 and the inner bayonet ring 32. A radial seal 110 is likewise provided between the drying agent box 56 and the inner bayonet ring 32. The system which is constructed and sealed in this way permits an inflow of compressed air into the inlet 52, a transfer of the compressed air into the region between the drying agent box 56 and the housing 64 of the air dryer cartridge 14, a deflection of the air into the central region 112, which is filled with drying agent, of the drying agent box 56, and a subsequent outflow of the dried air out of the air dryer cartridge 14 and into the valve housing 12, from which the dried air may then be extracted via the outlet 54. The compression of the drying agent which is present in the drying agent box 56 takes place by a spring device which acts on a compression device 118.

According to FIGS. 11 and 12, the connection of the cover 102 to the inner bayonet ring 32 takes place by way of the engagement of lugs 106 into openings 108 which are provided for this purpose in the inner bayonet ring 32.

With regard to the fastening of the cover 102 to the inner bayonet ring 32, FIG. 13 shows a variant. Here, lugs 106 do not engage into openings 108 of the inner bayonet ring 32. In fact, the lugs 106 lie in grooves 114 of the inner bayonet ring 32. The grooves 114 are arranged on the periphery of the inner bayonet ring, in such a way that they do not interfere with the projections required for the bayonet function.

The drying agent box 56 according to FIG. 9 has a fundamentally different design to the drying agent box 56 described in connection with FIGS. 1, 2 and 6. While the latter form a four-channel labyrinth, the drying agent box 56 according to FIG. 9 has no such labyrinthine design. It should be noted that the closed system according to FIG. 9 may likewise easily be combined with a drying agent box 56 with a labyrinthine design like that which is shown in FIGS. 1, 2 and 6. At the same time, the reverse is true, since the use of labyrinthine drying agent boxes is not strictly necessary for the open systems according to FIGS. 1, 2 and 6.

Figure 14:
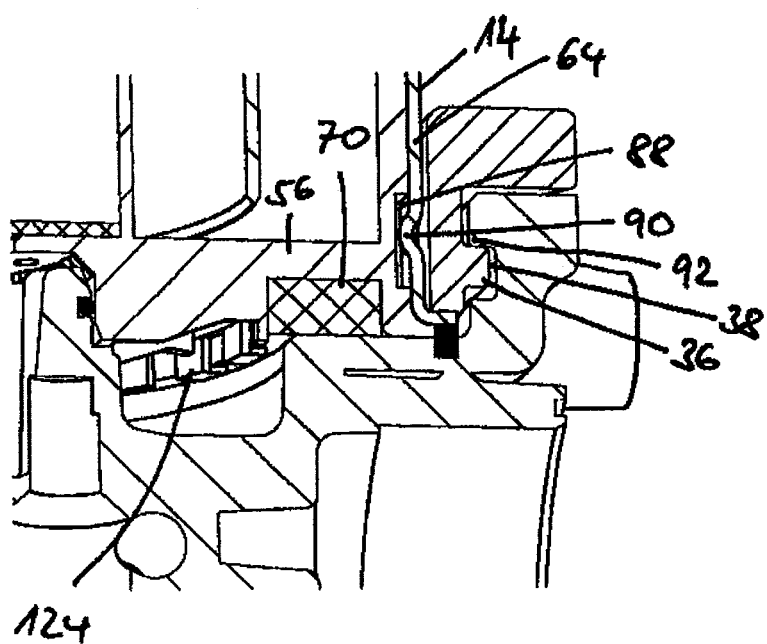
FIG. 14 shows a part of a compressed air supply device according to the invention in a sectioned illustration.

FIG. 14 shows a part of a compressed air supply device according to the invention in a sectioned illustration. In the illustration, it is possible to clearly see the connection between the housing 64 of the air dryer cartridge 14 and the drying agent box 56. A latching lug 90 is arranged in a recess 88. Also shown are holders 124 for holding the pre-filter 70.

Figure 15:
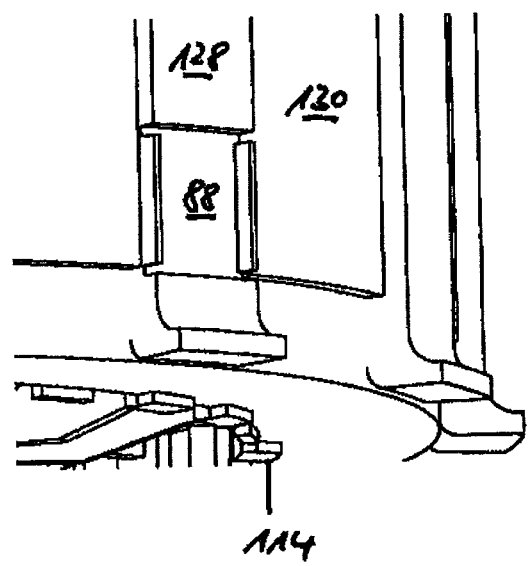
FIG. 15 shows a part of a drying agent box in a perspective illustration.

FIG. 15 shows a part of a drying agent box 56 in a perspective illustration. Here, it is likewise possible to see the recesses 88 and the holders 124. It is also possible to see regions 128 which have an increased diameter in relation to adjacent regions 130. When the drying agent box 56 is inserted into the housing 64 of the air dryer cartridge 14, the regions 128 bear against the housing 64. The regions 130 then serve as ducts in order to conduct the compressed air upward as it flows into the air dryer cartridge 14.

Figure 16:
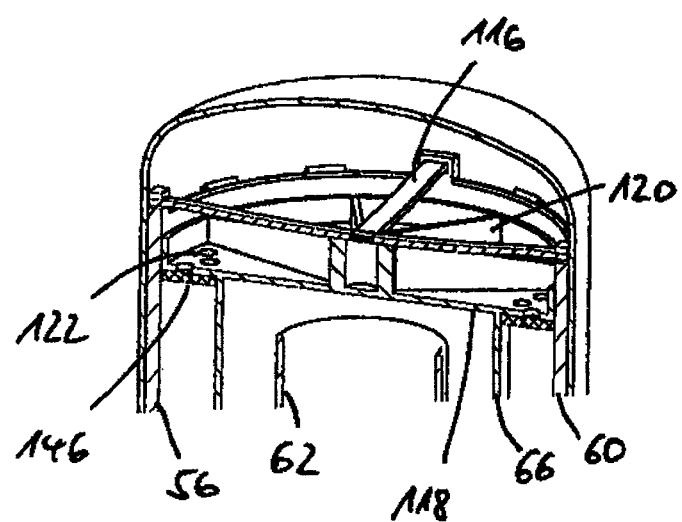
FIG. 16 shows a perspective, sectioned illustration of a part of an air dryer cartridge according to the invention.

FIG. 16 shows a perspective, sectioned illustration of a part of an air dryer cartridge according to the invention. A spring device 116 is fastened to the drying agent box 56, with the connection preferably being realized by injection molding. The spring device 116 is composed of two crossing resilient elements, which are connected to one another in the center of the arrangement. There, the resilient elements act downward on a compression device 118 with a force in order to thereby drive the latter into the drying agent box 56. Alternatively, it would for example be possible to provide a centrally arranged spiral spring which is supported on the housing 64 of the air dryer cartridge 14. The compression device 118 is stabilized by use of a multiplicity of webs 120 and has passage holes 122 which permit a passage of the air present above the compression device 118 into the duct between the outer tube piece 60, which is a constituent part of the drying agent box 56, and the tube piece 66 which is connected to the compression device 118. A filter 146 is arranged in the duct at the inlet side, which filter 146 is traversed by the air as it enters into the duct.

FIG. 17 shows a drying agent box 56 in a perspective illustration. The drying agent box 56 may, for example, be used in connection with the embodiment of the compressed air supply device 10 according to the invention described on the basis of FIGS. 1 and 2. The spring 58 illustrated in FIG. 1 may project into the central opening 132 of the drying agent box 56 in order to act on the drying agent box 56 with a force in the direction of the air dryer cartridge 14. A plurality of spring lugs 134 are arranged at the periphery of the drying agent box 56, which spring lugs 134 engage in the manner of claws into the housing 64 of the air dryer cartridge 14 and thereby likewise exert an axially upwardly directed force on the drying agent box 56. With a suitable design of the spring lugs 134, it is under some circumstances possible to dispense with the spring 58, which projects into the opening 132, and this facilitates the assembly of the compressed air supply device 10. A multiplicity of openings 136 is provided in the region of the periphery of the drying agent box 56, via which openings 136 the compressed air flows into the drying agent. A multiplicity of openings 142 can be seen within the opening 132, through which openings 142 the compressed air can flow out of the drying agent box 56. Also visible are holders 124 for holding the pre-filter 70. Arranged further inward are non-return valves 138, by which the drying agent box can be flushed. The non-return valves are situated directly below the region which is filled with drying agent, with a nonwoven filter 68 preferably shielding the non-return valves 138 from the drying agent. The drying agent box 56 also has an opening 140. A pin which is connected to the valve housing extends into the opening 140 as the air dryer cartridge 14 is placed onto the valve housing 12. The pin serves to pre-center the air dryer cartridge 14 relative to the valve housing 12 and to prevent the components from rotating relative to one another. The pin on the valve housing is preferably of such a length that the pin provides the first contact between the valve housing 12 and the air dryer cartridge 14 during the assembly of the air dryer cartridge 14.

TABLE OF REFERENCE SYMBOLS

- 10 Compressed air supply device
- 12 Valve housing
- 14 Air dryer cartridge
- 16 Bayonet connection
- 18 Collar
- 20 Collar section
- 22 Base
- 24 Outer bayonet ring
- 28 Recess
- 30 Seal
- 32 Inner bayonet ring
- 34 Collar
- 36 Projection
- 38 Recess
- 40 Foot flange
- 42 Securing element
- 44 Opening
- 46 Opening
- 48 Lug
- 50 Spring
- 52 Inlet
- 54 Outlet
- 56 Drying agent box
- 58 Spring
- 60 Outer tube piece
- 62 Inner tube piece
- 64 Housing
- 66 Tube piece
- 68 Nonwoven filter
- 70 Pre-filter
- 72 Duct
- 73 Duct
- 76 Seal
- 78 Collar
- 80 Projection
- 82 Seal
- 84 Securing element holder
- 86 Corrugated surface
- 88 Recess
- 90 Latching lug
- 92 Projection
- 94 Surface
- 96 Run-on bevel
- 98 Shoulder
- 100 Bore
- 102 Cover
- 104 Flanged edge
- 106 Lug
- 108 Opening
- 110 Radial seal
- 112 Drying agent region
- 114 Groove
- 116 Spring device
- 118 Compression device
- 120 Web
- 122 Passage hole
- 124 Holder
- 128 Region
- 130 Region
- 132 Opening
- 134 Spring lug
- 136 Opening
- 138 Non-return valve
- 140 Opening
- 142 Opening
- 144 Seal
- 146 Filter The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A compressed air supply device for a utility vehicle, comprising:
   a valve housing;
   an air dryer cartridge arranged on the valve housing, the air dryer cartridge having a cartridge housing;

a drying agent box filled with a drying agent, the drying agent box being arranged in the cartridge housing of the air dryer cartridge; and an elastic device operatively configured to compress the drying agent in the drying agent box, wherein the elastic device is a spring, said spring being supported on the valve housing and acting to drive the drying agent box into the air dryer cartridge.

2. A compressed air supply device for a utility vehicle, comprising:

a valve housing;

an air dryer cartridge arranged on the valve housing, the air dryer cartridge having a cartridge housing;

a drying agent box filled with a drying agent, the drying agent box being arranged in the cartridge housing of the air dryer cartridge; and an elastic device operatively configured to compress the drying agent in the drying agent box, wherein the drying agent box comprises a base having arranged thereon an outer tube piece and an inner tube piece, said outer and inner tube pieces being open at end sides facing away from the base, and further wherein a further tube piece is arranged between the outer tube piece and the inner tube piece, said further tube piece being open at an end side facing toward the base and being moveable in an axial direction relative to the drying agent box via the elastic device.

3. The compressed air supply device according to claim 2, wherein the cartridge housing, the outer tube piece, the further tube piece, and the inner tube piece form a labyrinth through which compressed air to be dried is flowable while undergoing three reversals in a flow direction.

4. The compressed air supply device according to claim 2, wherein the further tube piece is fastened to the cartridge housing.

5. The compressed air supply device according to claim 3, wherein the further tube piece is fastened to the cartridge housing.

6. The compressed air supply device according to claim 2, wherein the further tube piece is fastened to a compression device, the elastic device being a spring device fastened to the drying agent box and driving the compression device into the drying agent box.

7. The compressed air supply device according to claim 3, wherein the further tube piece is fastened to a compression device, the elastic device being a spring device fastened to the drying agent box and driving the compression device into the drying agent box.

* * * * *